UNITED STATES PATENT OFFICE.

HERMANN FRITZSCHE, OF BASEL, SWITZERLAND, ASSIGNOR TO SOCIETY OF CHEMICAL INDUSTRY IN BASLE, OF BASEL, SWITZERLAND.

DIAZOTIZABLE DYESTUFFS EASILY SOLUBLE IN WATER.

1,362,936. Specification of Letters Patent. Patented Dec. 21, 1920.

No Drawing. Application filed December 29, 1919. Serial No. 348,213.

*To all whom it may concern:*

Be it known that I, HERMANN FRITZSCHE, a citizen of the Swiss Republic, and resident of Basel, Switzerland, have invented new and useful Diazotizable Dyestuffs Easily Soluble in Water, of which the following is a full, clear, and exact specification.

I have found that by introducing the N-methyl-ω-sulforadicals into the substantive azodyestuffs, which can be further diazotized on the fiber and the further diazotizable amino groups of which are bound externally, there are obtained dyestuffs which show relatively to the dyestuffs which are not substituted in the diazotizable amino groups an improved solubility in water without sacrifice of their dyeing power. These dyestuffs constitute in a dry state red-brown to black-brown powders, which dissolve in water and in concentrated sulfuric acid to yellow to violet solutions. Their dyeings on cotton can be diazotized, obviously after the N-methyl-ω-sulfo radical is split off, and be developed with non-sulfonated developing compounds, as for instance betanaphthol, metaphenylenediamin, phenylmethylpyrazolone, etc., whereby the dyeings acquire an extraordinary fastness to washing.

Diazotizable dyestuffs containing N-methyl-ω-sulfoderivatives or N-methyl-ω-sulfonates of external amino groups can be prepared by the action of formaldehyde-bisulfite on the diazotizable dyestuffs containing at least one external amino group or by combining aromatic diazo-compounds with azodyestuff-components containing an external N-methyl-ω-suforadical.

The invention is illustrated by the following examples:

Example 1.

50 parts of the sodium salt of the azo-dyestuff derived from betadiazonaphthalene and metaaminobenzoyl-2-amino-5-oxynaphthalene-7-sulfonic acid (or the corresponding quantity of the paste obtained in the manufacture of this dyestuff) are diluted and mixed with 300 parts of water and to the mass thus obtained is added a mixture of 52 parts of a solution of sodium bisulfite of 40 per cent. and of 6 parts of formaldehyde in form of an aqueous solution of 30 to 40 per cent., previously heated to boiling. The mass is heated to boiling for about 1 hour, and the dyestuff is precipitated therefrom by an addition of common salt, filtered off, pressed and dried. The N-methyl-ω-sulfonate obtained is a red-brown powder easily soluble in water and dyes unmordanted cotton bluish-red tints becoming fast to washing by diazotizing on the fiber and development with betanaphthol. It corresponds to the formula

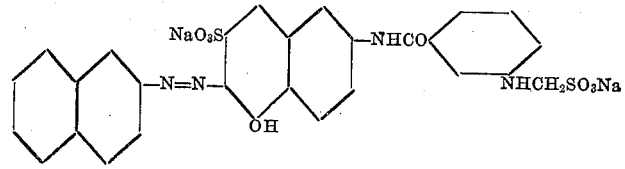

Example 2.

69 parts of the sodium salt of the disazo-dyestuff derived from 1 molecule of the tetrazoderivative of metaaminobenzoyl-meta-phenylenediamin and 2 molecules of 1.3′-aminophenyl-5-pyrazolone-3-carboxylic acid are diluted and mixed with 500 parts of water and thereto is added, while boiling, a mixture of 104 parts of a solution of sodium bisulfite of 40 per cent. and of an aqueous solution of 12 parts of formaldehyde. The mass is boiled until the dyestuff formed is completely dissolved; hereafter this latter is precipitated by addition of common salt and isolated as indicated in the foregoing example. The N-methyl-ω-sulfonate of the dyestuff constitutes a yellow powder and dyes unmordanted cotton directly yellow tints turning, when diazotized on the fiber and developed with betanaphthol to an orange fast to washing and becoming also fast to washing when diazotized on the fiber and developed with 1-phenyl-3-methyl-5-pyrazolone. It corresponds to the formula

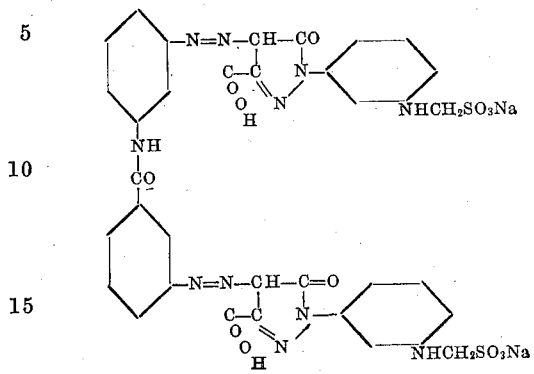

Example 3.

The aqueous solution of the diazoderivative of 14.3 parts of betanaphthylamin is introduced into the cold aqueous solution of 45.3 parts of the N-methyl-ω-sulfo-derivative of metaaminobenzoyl-2-amino-5-oxy-naphthalene-7-sulfonic acid and of 30 parts of calcined sodium carbonate. The reaction being terminated, the dyestuff is precipitated by common salt at 50° C., filtered off, pressed and dried.

The dyestuff is identical with the dyestuff of Example 1.

The N-methyl-ω-sulfo-metaaminobenzoyl-2-amino-5-oxynaphthalene-7-sulfonic acid or its disodium salt employed as parent material is prepared by heating for 2 hours at 80° to 90° C. 38 parts of sodium 2-metaaminobenzoyl-2-amino-5-oxynaphthalene-7-sulfonate with a mixture of 26 parts of solution of sodium bisulfite of 40 per cent. and of an aqueous solution of 6 gr. of formaldehyde. This solution can be employed directly for the preparation of the dyestuff.

Example 4.

22.6 parts of 3.3'-diamino-4.4'-ditolylmethane (see *Journal für Praktische Chemie*, neue Folge, Band 82, 1910, page 236) are dissolved in 50 parts (by volume) of hydrochloric acid of 30 per cent. and 200 parts of water and diazotized at 0° to 5° C. with 13.18 parts of sodium nitrite. The resulting solution of tetrazocompound is added to an aqueous solution of 90 parts of N-methyl-ω-sulfonate of 3'-aminophenyl-5-oxy-1.2-naphthimidazol-7-sulfonic acid and 60 parts of calcined sodium carbonate.

The dyestuff salted out at 50° C. and isolated in the usual manner constitutes a red powder and dyes unmordanted cotton directly claret tints turning, when diazotized on the fiber and developed with betanaphthol, to a bluish-red fast to washing. It corresponds to the formula

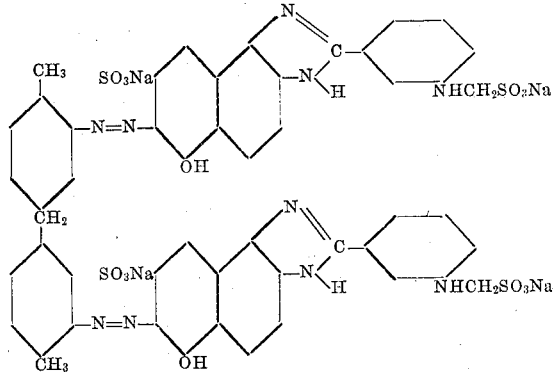

A dyestuff of very similar properties is obtained, when in this example there is substituted for the 3.3'-diamino-4-4'-ditolylmethane the equivalent quantity of 3.3'-diaminodiphenylmethane. This latter is obtained by complete reduction in the usual manner of the 3.3'-dinitrodiphenylmethane described in the German Patent No. 67001.

Example 5.

The solution of tetrazocompound derived from 22.6 parts of 3.3'-diaminoditolylmethane according to Example 4 is added to an aqueous solution of 93.5 parts of the methyl-ω-sulfo-derivative of the para-aminophenyl-urea of 2-amino-5-naphthol-7-sulfonic acid and of 60 parts of sodium carbonate. The dyestuff isolated in the usual manner constitutes a dark red powder and dyes cotton directly yellowish-red tints turning, when diazotized on the fiber and developed with betanaphthol, to a claret fast to washing. It corresponds to the formula

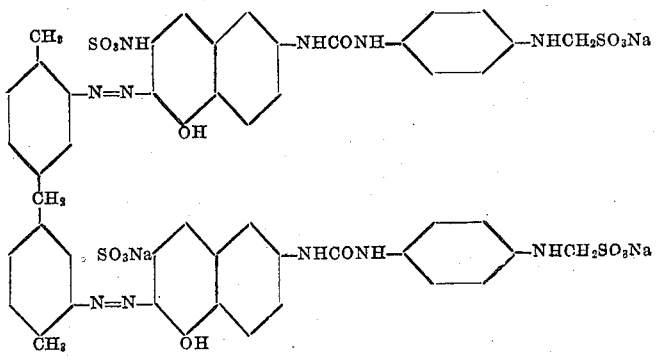

The following tabular exhibit shows for a certain number of dyestuffs able to be prepared according to the invention the tints of their direct dyeings and of their dyeings diazotized and developed with betanaphthol.

| The diazoderivative of— | Combined with— | Gives a dyestuff dyeing— | |
|---|---|---|---|
| | | Directly— | After diazotizing on the fiber and development with betanaphthol— |
| Paraaminoacetanilid | Methyl-ω-sulfoderivative of the m-aminobenzoyl-2-amino-5-naphthol-7-sulfonic acid. | Bluish-red tints | Bluish-red tints. |
| 1-Amino-2-methoxy-4-methylbenzene | Methyl - ω - sulfoderivative of the m-aminobenzoyl - 2 - amino - 5 - naphthol-7-sulfonic acid. | ...id | Id. |
| β-Naphthylamin | ...id | ...id | Id. |
| m.m'-Diaminoditolylmethane | 2 molecules id | Yellowish-red tints | Plain yellowish-red tints. |
| m.m'-Diaminodiphenylmethane | 2 molecules id | Red-orange tints | Reddish-orange tints. |
| p.p'-Diaminodiphenylether | 2 molecules id | Bluish-red tints | Red tints. |
| p-Aminoazobenzene | 1 molecule id | Blue-red tints | Bluish-red tints. |
| p-Aminoazotoluene (from o-toluidin) | 1 molecule id | Claret tints | Claret tints. |
| m.m'-Diaminoditolylmethane | 2 molecules methyl-ω-sulfoderivative of the 3'-aminophenyl-5-oxy-1.2-naphthimidazol-7-sulfonic acid. | Yellowish-claret tints | Blue-red tints. |
| m.m'-Diaminodiphenylurea | ...id | Bluish-red tints | Bluish-red tints. |
| m-Aminobenzoyl-m-phenylenediamin | ...id | Yellow-red tints | Yellow-red tints. |
| p.p'-Diaminodiphenylether | ...id | Claret tints | Claret tints. |
| Azoxyanilin | ...id | Blue-red tints | Yellowish-red tints. |
| m.m'-Diaminoditolylmethane | Methyl-ω-sulfoderivative of the p-aminophenylurea of 2-amino-5-oxynaphthalene-7-sulfonic acid. | Yellow-red tints | Claret tints. |
| m.m'-Diaminoditolylmethane | Methyl-ω-sulfoderivative of the m-aminophenylurea of 2-amino-5-oxynaphthalene-7-sulfonic acid. | Yellow-red tints | Claret tints. |
| m-Aminobenzoyl-m-phenylenediamin | 2 molecules methyl-ω-sulfoderivative of m-aminophenylpyrazolone carboxylic acid. | Yellow tints | Orange tints. |
| m.m'-Diaminodiphenylmethane | 2 molecules methyl-ω-sulfoderivative of m-aminophenylpyrazolone carboxylic acid. | Yellow tints | Yellow-orange tints. |

What I claim is:

1. As new products the herein described substantive azodyestuffs, easily soluble in water and diazotizable on the fiber, which contain an external N-methyl-ω-sulfo-radical, constitute in a dry state red-brown to black-brown powders soluble in water and in concentrated sulfonic acid to yellow to violet solutions and dye cotton directly yellow to claret tints becoming extraordinarily fast to washing, when diazotized on the fiber and developed with a non-sulfonated developing compound.

2. As new products the herein described substantive azodyestuffs, easily soluble in water and diazotizable on the fiber which are derived from the tetrazo-derivative of a diamin corresponding to the formula $$NH_2-R-X-R'-NH_2$$

(wherein R and R' stand for aromatic radicals, which may be substituted, and X for a link of indifferent character and consisting of at least one atom) and a component able to combine with a diazo group and containing an external N-methyl-ω-sulfo-radical and constitute in a dry state red-brown to black-brown powders soluble in water and in concentrated sulfuric acid to yellow to violet solutions and dye cotton directly yellow to claret tints becoming extraordinarily fast to washing, when diazotized on the fiber and developed with a non-sulfonated developing compound.

3. As new products the herein described substantive azodyestuffs, easily soluble in water and diazotizable on the fiber which are derived from the tetrazo derivative of a diamin corresponding to the formula

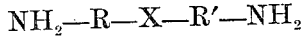

(wherein R and R' stand for aromatic radicals, which may be substituted and X for a link of an indifferent character and consisting of at least one atom) and a derivative of 2-amino-5-oxynaphthalene-7-sulfonic acid containing an external N-methyl-ω-sulfo-radical and constitute in a dry state red-brown to black-brown powders soluble in water and in concentrated sulfuric acid to red to violet solutions and dye cotton directly red to claret tints becoming extraordinarily fast to washing, when diazotized on the fiber and developed with a non-sulfonated developing compound.

4. As new products the herein described substantive azodyestuffs, easily soluble in water and diazotizable on the fiber, which are derived from the tetrazoderivative of 3.3'-diamino-4.4'-dimethyldiphenylmethane and a derivative of 2-amino-5-oxynaphthalene-7-sulfonic acid containing an external N-methyl-ω-sulfo radical, and constitute in a dry state red-brown to black-brown powders soluble in water and in concentrated sulfuric acid to red to violet solutions and dye cotton directly red to claret tints becoming extraordinarily fast to washing, when diazotized on the fiber and developing with a non-sulfonated developing compound.

In witness whereof I have hereunto signed my name this 29th day of November, 1919, in the presence of two subscribing witnesses.

HERMANN FRITZSCHE.

Witnesses:
WILLIAM E. HOLLAND,
AMAND BRAUN.